United States Patent [19]

Kohgami et al.

[11] Patent Number: 5,187,578
[45] Date of Patent: Feb. 16, 1993

[54] TONE DISPLAY METHOD AND APPARATUS REDUCING FLICKER

[75] Inventors: Akihiko Kohgami, Kokubunji; Shigeo Mikoshiba, Tokyo; Shinichi Shinada; Mutsumi Suzuki, both of Kokubunji, all of Japan

[73] Assignee: Hitachi, Ltd., Tokyo, Japan

[21] Appl. No.: 908,791

[22] Filed: Jul. 6, 1992

Related U.S. Application Data

[63] Continuation of Ser. No. 663,619, Mar. 4, 1991, abandoned.

[30] Foreign Application Priority Data

Mar. 2, 1990 [JP] Japan .................................. 2-49346

[51] Int. Cl.$^5$ ............................................. H04N 5/57
[52] U.S. Cl. .................................... 358/168; 358/212; 340/793
[58] Field of Search ............... 358/169, 168, 170, 171, 358/212, 240; 340/793, 767

[56] References Cited

U.S. PATENT DOCUMENTS

| | | | |
|---|---|---|---|
| 3,843,959 | 10/1974 | Owaki et al. | 358/240 |
| 4,006,298 | 2/1977 | Fowler et al. | 340/767 |
| 4,074,320 | 2/1978 | Kapes, Jr. | 358/240 |
| 4,378,556 | 3/1983 | Wisnieff | 358/240 |
| 4,385,293 | 5/1983 | Wisnieff | 340/793 |
| 4,622,549 | 11/1986 | Criscimagna et al. | 340/767 |
| 4,709,995 | 12/1987 | Kuribayashi et al. | 340/793 |
| 4,808,991 | 2/1989 | Tachiuchi et al. | 340/793 |
| 4,870,324 | 9/1989 | Hara | 340/793 |
| 5,018,012 | 5/1991 | Tsuji | 358/171 |
| 5,030,947 | 7/1991 | Dieudonne et al. | 340/767 |
| 5,053,784 | 10/1991 | Barbier et al. | 340/793 |

OTHER PUBLICATIONS

"A Proposal of the Drive Method for TV Using AC Type Plasma Display Panel"; T. Kaji et al., ITEJ Technical Report, vol. IT72-45 (1973-03); pp. 1-10.

"A Color TV Display Using 8-Inch Pulse Discharge Panel with Internal Memory"; H. Murakami et al.; ITEJ Technical Report, vol. 38, No. 9 (1984) pp. 836-842.

"Recovery of Capacitive Power Loss in Townsend Discharge TV"; A. Kohgami et al.; ITEJ Technical Report, vol. 13, No. 58 (1989); pp. 7-12.

Proceedings of the Sid., vol. 21, No. 4, 1980, Los Angeles, U.S. pp. 327-332; H. Murakami, et al., "An Experimental TV Display Using a Gas-Discharge Panel With Internal Memory".

Patent Abstracts of Japan, vol. 14, No. 349 (P-1084) Jul. 27, 1990, & JP-A-02 125287, May 14, 1990.

*Primary Examiner*—James J. Groody
*Assistant Examiner*—Jeffrey S. Murrell
*Attorney, Agent, or Firm*—Antonelli, Terry, Stout & Kraus

[57] ABSTRACT

In a display device for pictures, etc., adequate brightness of pictures to be displayed is provided by varying the luminous times of the luminous elements making up the a display panel. The luminous elements receive multiple-bit codes representing levels of brightness from signals to be displayed. A time corresponding to a field of television signals is divided into a plurality of sub-fields corresponding to the bits of a multiple-bit code. The plurality of sub-fields have lengths of time proportional to weights of the corresponding bits. The luminous elements have different levels of brightness in sub-fields corresponding to bits of a multiple-bit binary code. For each luminous element, the time interval from a light emission start time in a sub-field where the first light emission occurs in a time corresponding to a field of television signals till a light emission start time in a sub-field where the last light emission occurs in a time corresponding to the next field of television signals is made shorter than the critical fusion period of the perception characteristic of human eyes.

34 Claims, 9 Drawing Sheets

| (FIRST FIELD) | | | | (SECOND FIELD) | | | |
|---|---|---|---|---|---|---|---|
| b7₁ | A | b6 | b7₂ | b7₁ | A | b6 | b7₂ |
| 1 | X | 0 | 0 | 1 | X | 1 | 0 |
| 0 | X | 1 | 0 | 1 | X | 1 | 0 |
| 0 | X | 0 | 1 | 0 | X | 1 | 1 | b6 → b7

FIG. 10b

| (FIRST FIELD) | | | | (SECOND FIELD) | | | |
|---|---|---|---|---|---|---|---|
| b7₁ | A | b6 | b7₂ | b7₁ | A | b6 | b7₂ |
| 1 | X | 1 | 0 | 0 | X | 1 | 0 |
| 1 | X | 0 | 1 | 0 | X | 1 | 0 |
| 0 | X | 1 | 1 | 0 | X | 0 | 1 | b7 → b6

TONE DISPLAY METHOD AND APPARATUS REDUCING FLICKER

This application is a continuation of application Ser. No. 07/663,619, filed Mar. 4, 1991, now abandoned.

BACKGROUND OF THE INVENTION

This invention relates to a method of and a device for tone display, and more particularly to a method of and device for tone display providing suitable brightness of displayed pictures, that is, fine tone display of brightness in display devices of pictures, etc., by controlling the luminous times of luminous elements corresponding to the pixels.

As a brightness control method of luminous elements corresponding to the pixels, there is a known method of tone display involving controlling the luminous times of the luminous elements. For example, a memory type plasma display is described in "A Proposal of the Drive Method for TV Using AC Type Plasma Display Panel", T. Kaji et al., ITEJ Technical Report Vol. IT72-45 (1973-03), pp. 1-10. This method uses a multiple-bit code to represent a fixed luminous time (say, one field of television signals, i.e. 1/60 sec.) To be more specific, time is assigned to the bits of a multiple-bit code in proportion to bit weights, and light emission or no light emission at the respective bits of the multiple-bit code of brightness is selected for each pixel, thereby controlling the gradation of brightness. Literature about television using tone display by time division includes "A Color TV Display Using 8-Inch Pulse Discharge Panel with Internal Memory", H. Murakami et al., and "Recovery of Capacitive Power Loss in Townsend Discharge TV", A. Kohgami et al., ITEJ Technical Report Vol. 13, No. 58 (1989), pp. 7-12.

Figure 13:
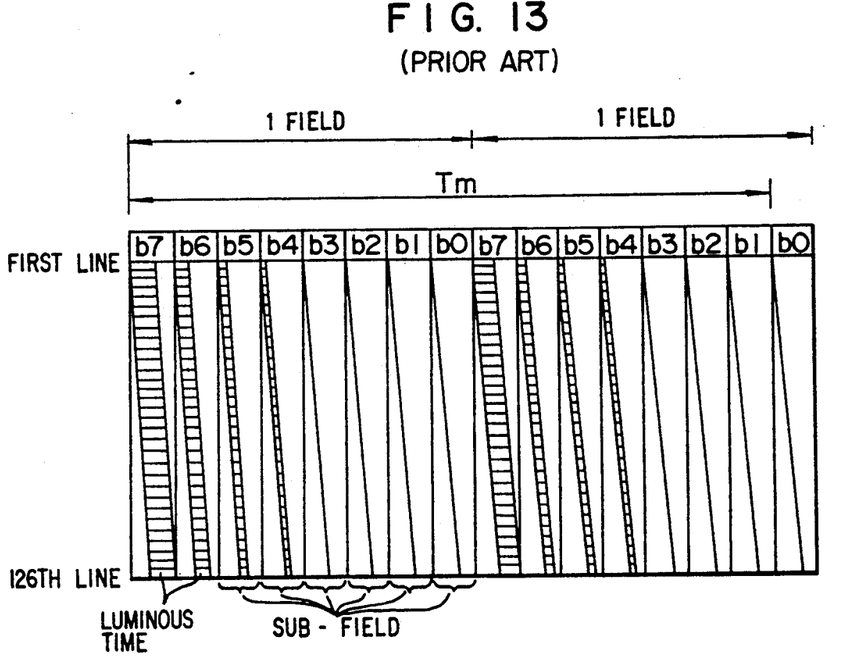
FIGS. 13 and 14 are time charts for explaining methods of tone display.

As shown in FIG. 13, Murakami et al., divide time corresponding to a field into eight sub-fields, which are equally spaced. The respective sub-fields are arranged to correspond to the bits (b7 to b0) of a multiple-bit code representing the brightness of each pixel. At least in a selected sub-field of a multiple-bit code, the luminous elements are made to emit light on the display screen for a time corresponding to the weight of the sub-field.

Figure 14:
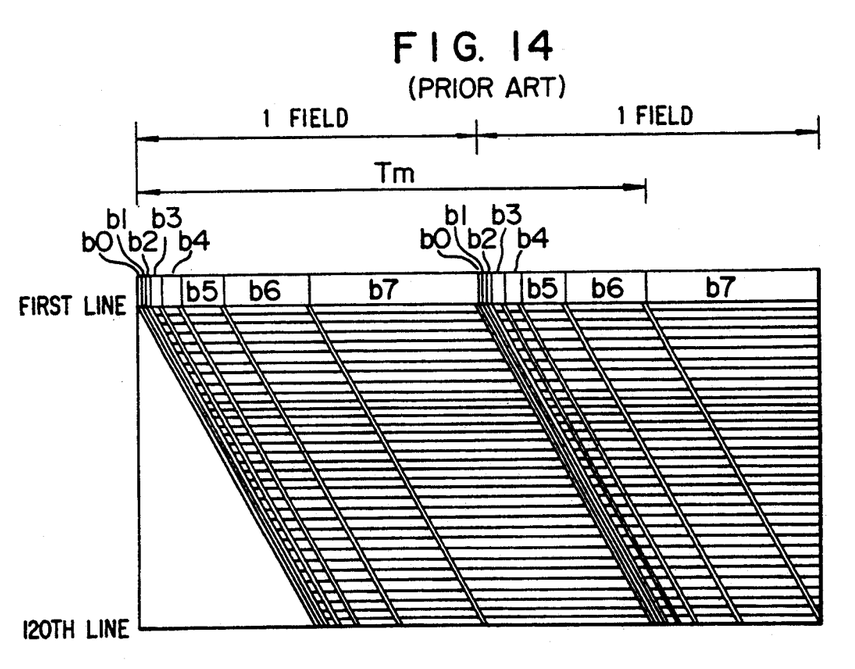

As presented in FIG. 14, Kohgami et al. divide time corresponding to a field into eight time domains (b0 to b7) such that the eight time domains have the lengths of times corresponding to the weights of the bits of a multiple-bit light emission code. Over the whole time of at least a selected sub-field of a multiple-bit code, the luminous elements are made to emit light for display. Incidentally, the lines of the bits of FIG. 13 are shifted by 1 H (horizontal scanning time) from one another, since pulses for selecting lines are emitted a little shifted line after line so that two lines are not selected at the same time.

It has been found that in the prior art mentioned above, a disturbance such as a flicker occurs in tone display when the displayed picture is large, or the brightness is high or there is some movement in the picture. More specifically, when the display method of FIG. 13 is used, since the luminous time in one field is short, the displayed picture is dark, and therefore, adequacy in tone display is not achieved. When the display method of FIG. 14 is used, no more than 120 scanning lines are displayed, detail of the picture is not obtained, so that an inferior quality in tone display results. However, it has been made clear that when those methods were used in a large-sized gas-discharge television receiver with a 40-inch class screen, pictures were displayed so that the highest brightness is more than 50 FL ($\approx 171$ dc/m$^2$), and as a result, a notable disturbance occurs in the tone display in moving pictures.

To be more specific, when a person's face is shown, for instance, a white streak runs along the cheek when the face moves. In other words, in a smooth tone display, when something moves in a moving picture a streak occurs in some place, as if a tone bit is missing, a peculiar phenomenon that does not appear with the display elements of a conventional cathode-ray tube, for example, and this gravely impairs the picture quality of television.

SUMMARY OF THE INVENTION

An object of this invention is to provide a display method and device with reduced disturbance in tone display in a display device providing a tone by varying the luminous time of the luminous elements.

In order to achieve the above object, according to this invention, in a method of tone display for showing the gradation in brightness by converting signals to be displayed into binary-coded signals of multiple bits for the pixels and varying the luminous times of the luminous elements in a time corresponding to a field of television signals, for the luminous elements the time interval from the light emission start time at the bit where the first light emission occurs in a time corresponding to a field till the light emission start time at the bit where the last light emission occurs in a time corresponding to the next field is made shorter than the critical fusion period of the perception characteristic of human eyes. By the critical fusion period here is meant a period in which a flicker becomes unrecognizable when light emission and no light emission of the luminous elements are repeated with a fixed brightness in a fixed time.

It is also possible to divide at least a bit, of multiple bits constituting a binary code mentioned above into two or more time domains and make the luminous elements emit light at the separated time domains. A display device for embodying the above-mentioned method operates as follows. In a display device comprising an encoder circuit for converting a signal to be displayed into a multiple-bit code, luminous elements for being turned ON and OFF, and light emission control means for controlling light emission or no light emission of the luminous elements according to time distributed in proportion to the weights of the bits constituting a binary code mentioned above, the light emission control means for the luminous elements is arranged such that for the luminous elements the time interval from the start time of light emission at the bit where the first light emission occurs in a time corresponding to field till the light emission start time at the bit where the last light emission occurs in a time corresponding to the next field is shorter than the critical fusion period of the perception characteristic of human eyes. It is also possible to divide at least one bit of multiple bits constituting a binary code mentioned above into two or more time domains and make the luminous elements emit light at separated time domains. In a picture display device having a multitude of luminous elements arranged therein, for example, there is further provided scanning means for selecting luminous elements which are operated by ON/OFF control.

In the above-mentioned critical fusion period of the perception characteristic of human eyes, the average brightness required of the display device is more than 50 fL. For the reason to be described later, the critical fusion period is preferably 20 msec or less. Reducing the critical fusion period to the vicinity of 20 msec will decrease the disturbance in tone display.

When time corresponding to at least one bit of multiple bits constituting a binary code is divided into two or more time domains for light emission during display operation, the bit is divided by considering whether the device can be configured easily when such a way of bit divisions is done and how the disturbance in tone display is reduced. Which bits are selected and how display time domains are arranged are decided taking into consideration the ease with which the device is configured and effects of reduction of the disturbance in tone display. In a preferred embodiment the most significant bit or a few high-order bits, which have a long luminous time, are divided and moved to separate positions. The typical way of dividing time is to divide it into equal time domains. Alternatively, all bits are bisected and the same binary code is used twice for tone display in a time corresponding to a field.

A typical display device according to this invention is a gas discharge type television set using gas discharge luminous elements having a memory function, but it is not limited to this type of television set.

The principle of this invention will now be described. The above-mentioned disturbance in tone display was found to result from an instantaneous flicker in a specific pattern by a conventional time-division tone display. This will be described by using the method of tone display by Kohgami et al. shown in FIG. 14.

In the method of tone display by 256 different levels (8 bits) of brightness of FIG. 14, at the 127th level, for example, bits b0 to b6, the first half of one field, contribute to light emission, and at the 128th level, one level up, bit b7, the second half of the next field contributes to light emission. In other words, by a rise by only one level of the 256 tones, the bit position contributing to light emission greatly changes from the first half to the second half between the two fields. The instantaneous light emission period in this case is from the light emission start time at bit b0 of one field to the light emission start time at bit b7 of the next field. The time interval is 25 msec. If the 25 msec is a period at which a flicker is observed, this gives rise to a disturbance in tone display. If a moving picture is being shown, the disturbance in tone display spreads from cell to cell in the picture, so that the viewer clearly notes the flicker as a streak.

The principle of the method of time-division tone display including the flicker will be described. As described in Television Handbook, Part 1, Section 3.4, p. 55, it has been known as Talbot-Platea's law that if the brightness $L_1$ is displayed for $t_1$ second and the brightness $L_2$ for $t_2$ second alternately and repeatedly, the visual sensation of lightness as the perception characteristic of human eyes is given by $$L = \frac{t_1 L_1 + t_2 L_2}{t_1 + t_2}$$

Figure 15:
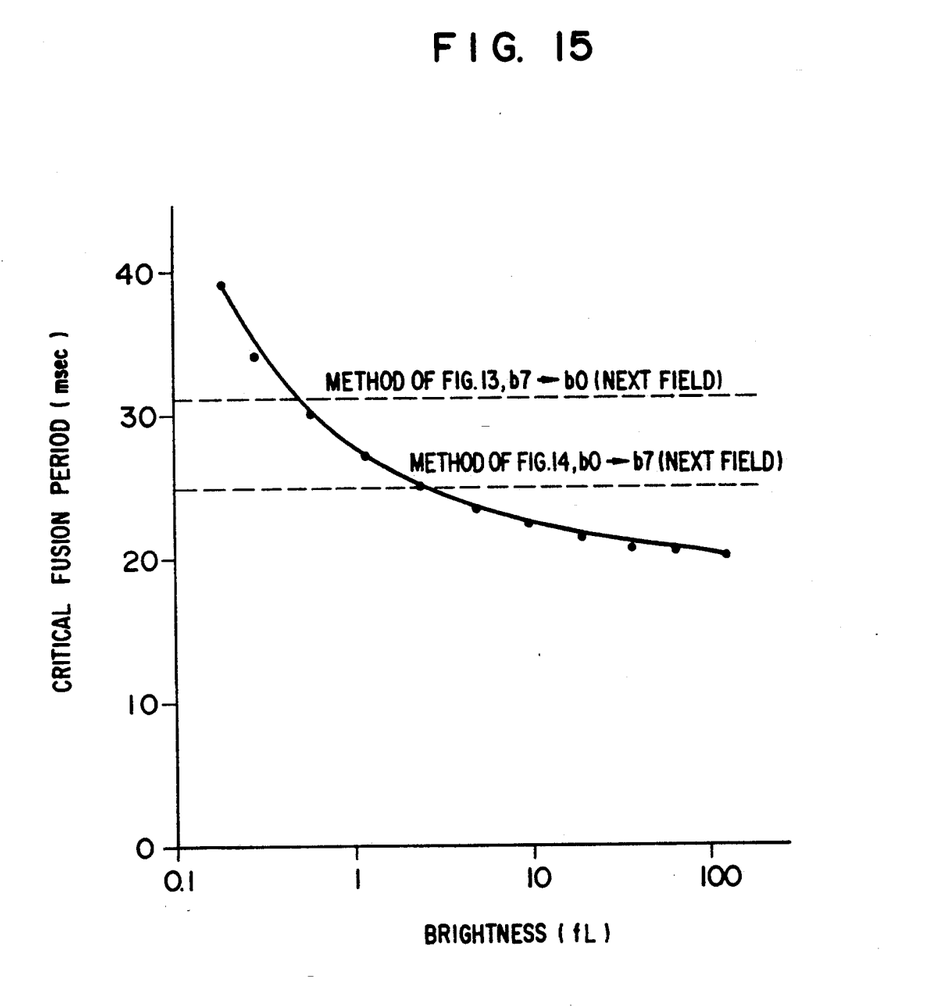
FIG. 15 is a diagram showing an example of measurement of critical fusion periods.

However, the required condition under which this law holds is when a flicker is not observed (referred to as a case of fusion). FIG. 15 shows measurement results of the periods at which a flicker became unobservable by changing the length of the period when the brightness was changed by varying the length of time of white-color display light emission with a memory type gas discharge television set. (This period is referred to as the critical fusion period). In FIG. 15, the upper broken line indicates the time interval of light emission start times from the first bit (b7) in one field to the last bit (b0) in the next field by the method of tone display of FIG. 13. (In the example of FIG. 13, time corresponding to one field is divided into eight equally divided subfields.) The lower broken line of FIG. 15 indicates the time interval of light emission start times from the first bit (b0) in one field to the last bit (b7) in the next field by the method of tone display of FIG. 14. (In the example of FIG. 14, time corresponding to one field is divided into eight bits at a ratio of 1:2:4...:128). As is evident from FIG. 15, in the methods of tone display, the time interval from the first bit in one field to the last bit of the next field is longer than the critical fusion period when the brightness is several fL or more. Therefore, if the light emitting condition at the respective bits changes as in a moving picture, an instantaneous flicker is observed, particularly in a light picture, giving rise to a disturbance in tone display and making the picture quality unsatisfactory.

On the other hand, in a method of tone display and a display device according to this invention, the time interval from the light emission start time at the bit where the first light emission occurs in a time corresponding to one field till the light emission start time at the bit where the last light emission occurs in a time corresponding to the next field is shorter than the critical fusion period of the perception characteristic of human eyes, and therefore there is no possibility of disturbance in tone display mentioned above. With the methods of FIGS. 13 and 14, the utilization rate of time for light emission in a field is low, with the result that the brightness of a television picture is low. As a countermeasure for this, time allotted to at least one bit of multiple bits constituting a binary code is divided into two or more time domains to increase chances of light emission, and the light emission times of the luminous elements are controlled. When television signals are displayed, since the light emission times for the time domains are dispersed in a field, the bit where additional time domains are produced is excluded from the bits with which the critical fusion period is considered. Therefore, the time interval from the light emission start time at the bit where the first light emission occurs in one field till the light emission start time at the bit where the last light emission occurs in the next field can be made shorter than the critical fusion period of the perception characteristic of human eyes. As a result, almost all of a field time can be utilized for light emission. To be more concrete, the average brightness required of the display device is 50 fL or more, and the critical fusion period of the perception characteristic of human eyes has only to be 20 msec or less.

DESCRIPTION OF THE PREFERRED EMBODIMENTS

Figure 1:
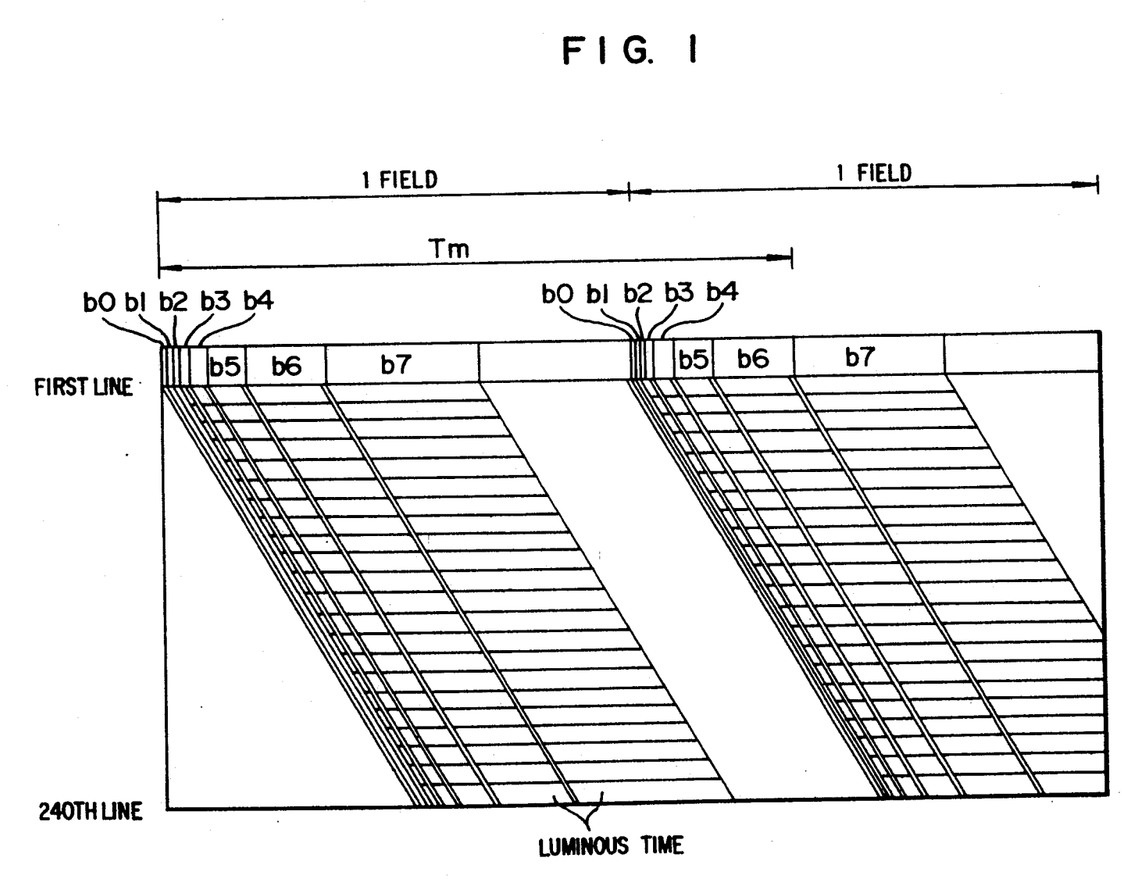
FIG. 1 is a time, chart for explaining a first embodiment of a method of tone display according to this invention.

Preferred embodiments according to this invention will be described with reference to the accompanying drawings. FIG. 1 is a time chart for explaining the operation of a first embodiment of the display method according to this invention. In the first embodiment, the scanning line number is 240, signals to be displayed are coded in an 8-bit binary code, and 256 levels of brightness are used.

In FIG. 1, 240 horizontal scanning lines are shown in the vertical direction, while time for two fields (1/60 sec×2) of television signals are shown in the horizontal direction. As is clear from FIG. 1, for the luminous elements the whole time of one field does not correspond to the maximum light emission time. In other words, the light emission time band is pushed to one side of a field, so that the time interval Tm from the light emission start time at bit b0 where the first light emission occurs in one field till the light emission start time at bit b7 where the last light emission occurs in the next field is made shorter than the critical fusion period (about 20 msec) of the perception characteristic of human eyes. The arranged order of bits need not be limited to the one shown in FIG. 1. The way of pushing the light emission time band may be either to the left or right.

When the arranged order of bits of FIG. 1 is reversed to b7, b6, emission start time at b7 in one field till the light emission start time at b6 in the next field is made shorter than the critical fusion period, the same effects can be achieved. This mode of embodiment is possible.

Figure 2:
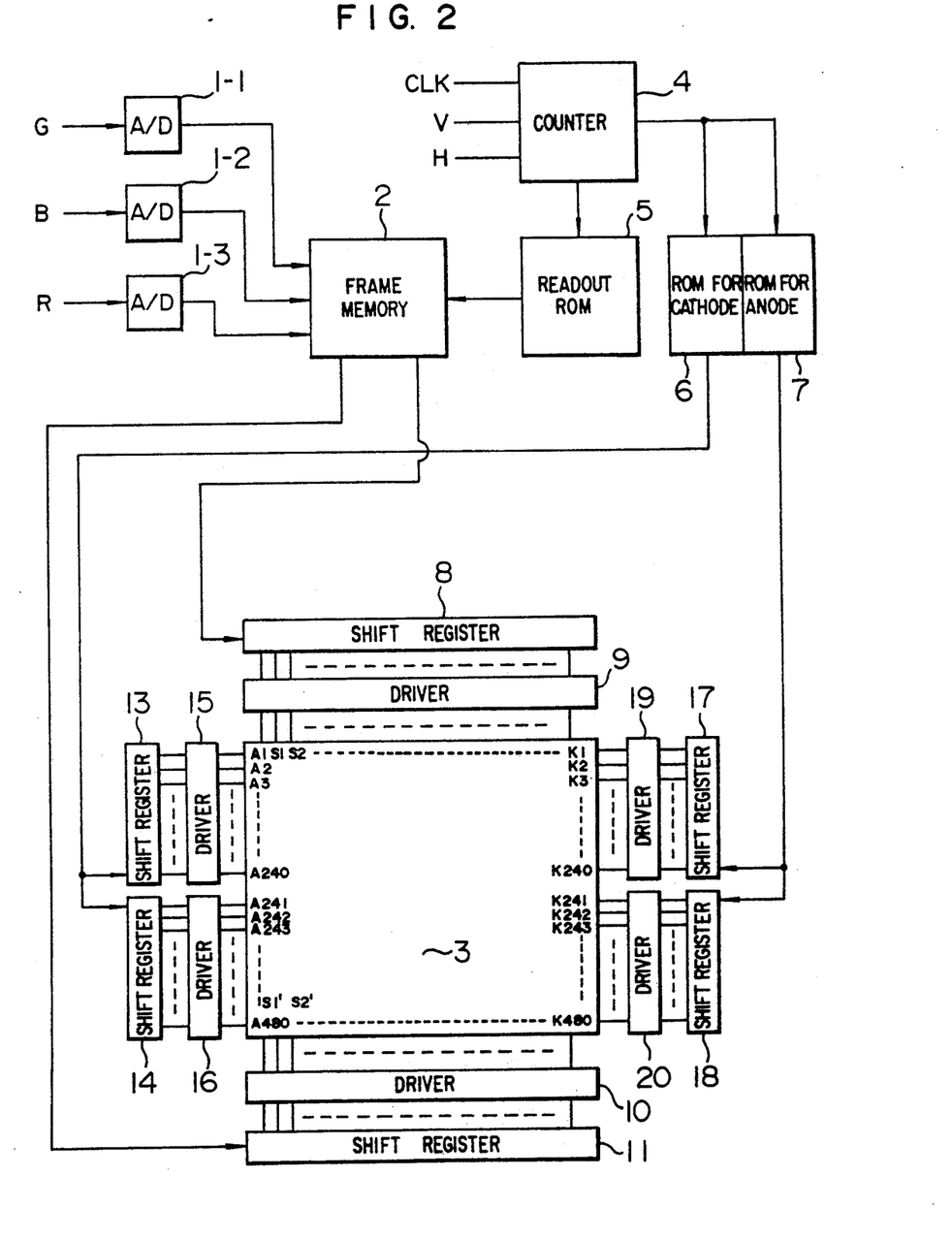
FIG. 2 is a circuit diagram showing an example of a composition of a display device according to this invention.

FIG. 2 is a circuit diagram of an example of a gas discharge television set, which is a display device according to this invention. Picture signals G, B and R, separated into color signals of green (G), blue (B) and red (R) of the television signals, are converted by A/D converters 1—1, 1-2, and 1-3 from analog form into digital signals (binary codes) of eight bits (b0, b1, b2, b3, b4, b5, b6, and b7), and are stored in a frame memory (or field memory) 2. On the other hand, to read signals from the frame memory 2, ROM 5 is used which is dedicated to generation of timing signals for the bits for tone display. This ROM 5 is operated by a counter 4 which counts clock signals CLK. To reset the counter 4, a V (vertical synchronous) signal or, if necessary, an H (horizontal synchronous) signal of television signals is used. The frame memory 2 is read by accessing addresses, where bit signals of the scanning lines are stored, by timing of the bits (b0, b2, ..., b7) shown in FIG. 1. Bit signals read from the frame memory 2 are added to shift registers 8 and 11 of a driver circuit for auxiliary anodes of the luminous elements to be described later. The bit signals are passed through drivers 9 and 10 for determining the pulse width and for converting the bit signals to high voltage signals necessary to drive the gas discharge panel 3, and these high voltage signals are applied to the auxiliary anodes $S_1$, $S_2$, ..., $S_1'$, $S_2'$, $S_3'$ of the luminous elements constituting the gas discharge panel 3.

ROM 6 for the cathodes and ROM 7 for the anodes, respectively, use the output from counter 4 to apply signals to shift registers 13, 14 and 17, 18 to generate drive signals to drive the anodes and the cathodes of the luminous elements constituting the gas discharge panel 3. Signals from the shift registers 13, 14 and 17, 18 are converted by drivers 15, 16 and 19, 20, respectively, into signals with a required pulse width and high voltage signals, are applied to the anode lead wires $A_1$, $A_2$, $A_3$ ... $A_{240}$, $A_{241}$ ... $A_{480}$ and the cathode lead wires $K_1$, $K_2$, $K_3$ ... $K_{240}$, $K_{241}$ ... $K_{480}$ of the luminous elements constituting the gas discharge panel 3. Those ROMs, shift registers, and drivers constitute a driver circuit for selecting luminous elements to emit light for display. The reason why the gas discharge panel 3 is divided into two upper and lower parts is that two scanning lines are driven at the same time.

Figure 3:
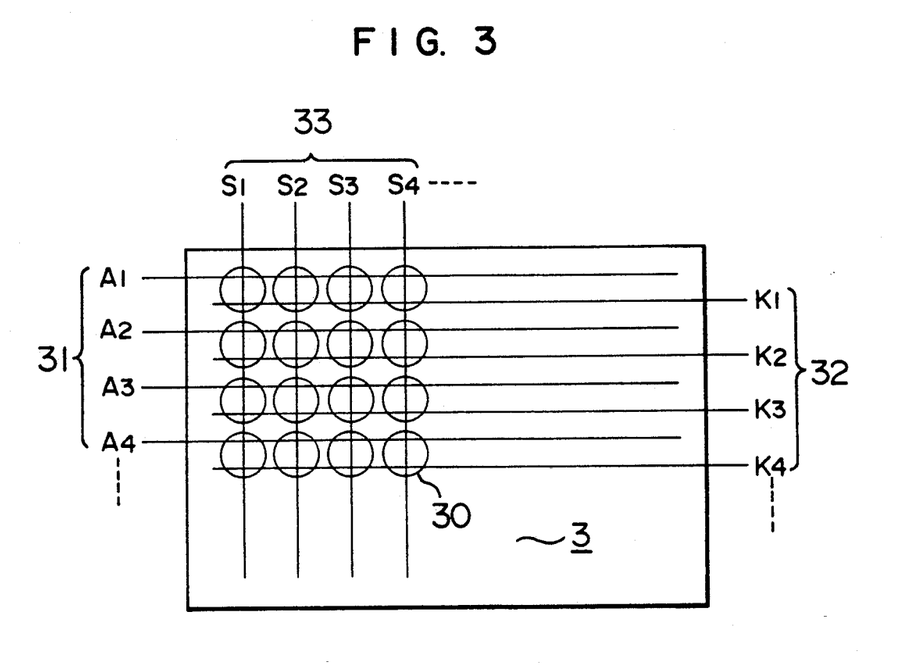
FIG. 3 is a construction diagram of a gas discharge panel used in the display device of FIG. 2.

FIG. 3 is a fragmentary view, on an enlarged scale, of the gas discharge panel 3 and shows the electrode wiring of the luminous elements. In the gas discharge panel 3, a plurality of luminous elements 30 are arranged in a matrix form, that is, in rows and columns. As will be described later by reference to FIG. 4, a luminous element 30 has three electrodes, an anode, a cathode, and an auxiliary anode, and a memory function. In FIG. 3, first electrode lead wires 32 ($K_1$, $K_2$, ... $K\lambda$) and third electrode lead wires 31 ($A_1$, $A_2$, ... $A\lambda$) are laid in the horizontal direction to connect respectively t the cathodes and the anodes of the luminous elements 30. Auxiliary anode (second electrode) lead wires 33 ($S_1$, $S_2$, ...) are laid in the vertical direction to connect to the auxiliary anodes S of the luminous electrodes 30. As has been mentioned, if the horizontal scanning line number of the gas discharge panel 3 is 480 and the panel is divided into upper and lower parts and 2-line-at-a-time addressing is used, the auxiliary anode lead wires 33 are separated at the central part of the panel 3. The first electrode lead wires 32 ($K_1$, $K_2$, ... $K\lambda$), the third electrode lead wires 31 ($A_1$, $A_2$, ... $A\lambda$), and the auxiliary anode (second electrode) lead wires 33 ($S_1$, $S_2$, ...) receive drive signals respectively from the the driver 19 (or 20) for the cathodes, the driver 15 (or 16) for the anodes, and the driver 9 (or 10) for the auxiliary anodes.

Figure 4:
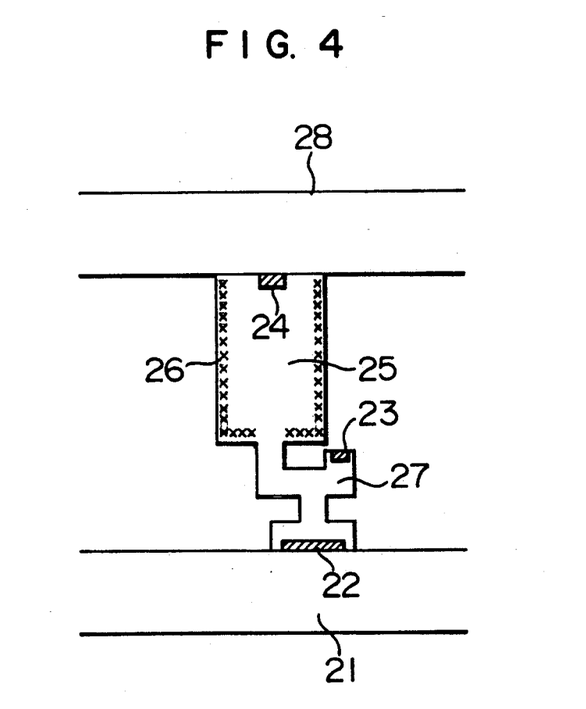
FIG. 4 shows a cross section of a luminous element used to form a gas discharge panel.

FIG. 4 shows a cross section of a luminous element 30. On a base plate 21, there is formed a first electrode (cathode) 22 made of Ba, Ni, LaBa, for example. On the other hand, on a face plate 28, a third electrode (display electrode) 24 is formed by a printing technique. As shown in FIG. 4, a discharge space (a display discharge space 25 and an auxiliary discharge space 27) is formed by stacking many spacers which have a hole bored therein. A second (auxiliary) electrode 23 is disposed as shown in FIG. 4. When discharge (display discharge) occurs between the first electrode 22 and the third electrode 24, ultraviolet rays are generated by a gas (Xe or a mixed gas such as Ne—Xe, He—Xe) in the display discharge space 25, causing a phosphor 26 to emit light for display. Between the first electrode 22 and the second electrode 23, a so-called auxiliary discharge occurs. Whether or not this auxiliary discharge is allowed to proceed to a display discharge between the first electrode 22 and the third electrode 24 is controlled by the presence or absence of a pulse which causes an ignition at the second electrode. Since this auxiliary discharge does not excite the phosphor 26, the auxiliary discharge has no influence on light emission for display.

Figure 5:
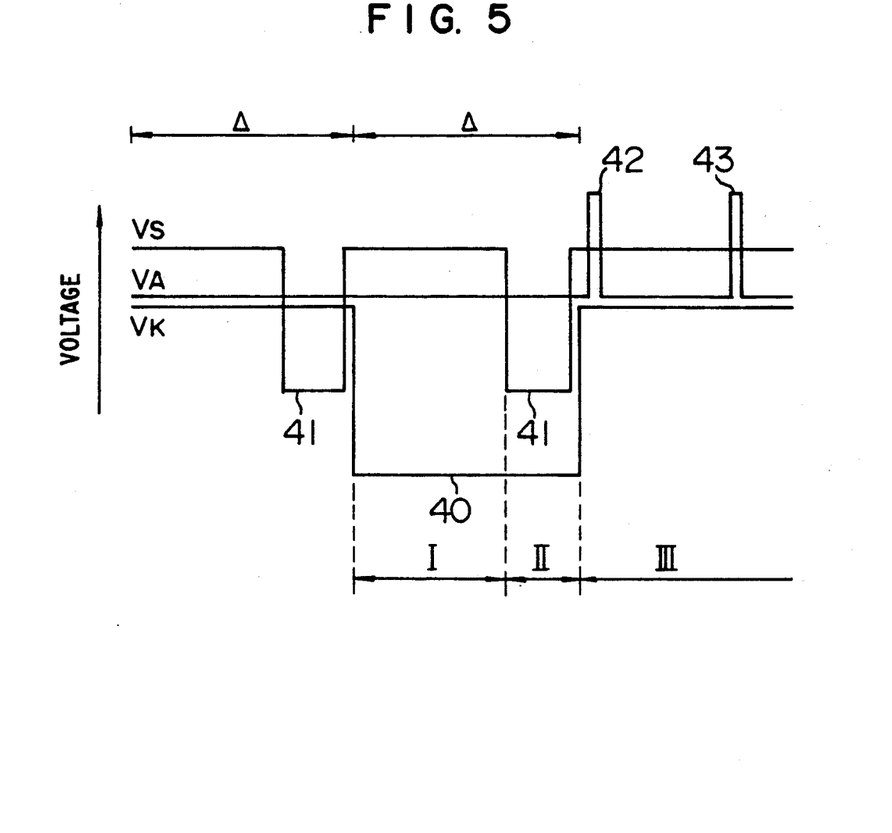
FIG. 5 is a voltage waveform diagram for explaining the operation of the luminous element of FIG. 4.

The state of discharge between the various electrodes will be described by reference to the time chart of FIG. 5. In FIG. 5, $V_k$ indicates a waveform of a voltage applied to the first electrode lead wire, while 40 indicates a pulse for addressing a line on the gas discharge panel 3, and this pulse is called a first-electrode scanning pulse. In the example in FIG. 5, the pulse width of this first-electrode scanning pulse is made equal to a length of time $\Delta$ allotted for addressing a line. For instance, if the scanning time of each line is 1 H, 240 lines are provided in one field (the number of lines in the upper half of a 2-line-at-a-time addressing type panel), and an 8-bit tone display described by reference to FIG. 1 is done, the pulse width $\Delta$ is approximately equal to 8 $\mu$s.

Vs indicates a waveform of a pulse voltage applied to a second-electrodge lead wire, and a pulse 41 indicates a second-electrode pulse, the pulse width of which is narrower than the first-electrode scanning pulse 40. The second-electrode pulse occurs near the end of the pulse width $\Delta$. This second-electrode pulse 41 will be present or absent depending on the contents of a television signal, that is, whether or not the bit signal is "1" or "0".

$V_A$ indicates a waveform of a pulse voltage applied to third-electrode lead wires. For a first-electrode lead and a third-electrode lead, which have the same line number, narrow-width pulses 42, 43, which are to be applied to the third-electrode lead, are applied just after a first-electrode scanning pulse 40 with a number of pulses determined according to the number of bits for tone display.

Description will now be made of the operation of a gas discharge luminous element 30 in relation to the periods I, II, and III in FIG. 5. When a first-electrode scanning pulse 40 is applied, in the period I, discharge occurs between the first electrode and the second electrode. This is called auxiliary discharge. The discharge path occurs in the auxiliary discharge space 27 shown in FIG. 4. Since there is no phosphor applied to the internal walls of the space 27 and the space is located hidden from the front face of the panel, discharge in this space has little influence on the quality of the displayed picture. In the period II in which a pulse 41 is applied to the second electrode, the potential difference between the first electrode and the second electrode becomes small, with the result that discharge between the first electrode and the second electrode stops. However, since auxiliary discharge has occurred in the period I, there are lots of space charges in the period II in the vicinity of the first electrode, and therefore, discharge takes place between the first electrode and the third electrode. The transfer of discharge from the second electrode to the third electrode is here referred to as switching. When this switching occurs, many charged particles are produced in the discharge path (the display discharge space 25 in FIG. 4) between the first electrode and the third electrode.

In the period III, a pulse 42 with a narrow pulse width is first applied to the third electrode. Since there are many charged particles in the display discharge space 25 due to switching in the period II mentioned above, this pulse 42 causes a pulse-like discharge to occur between the first and third electrodes. By this pulse-like discharge, more charged particles are produced in the display discharge space 25. The next discharge causes discharge to occur. As described above, in the period III, discharge is maintained while pulses are applied successively or until a new pulse voltage is applied to the first electrode. This function is called a pulse memory function. By this pulse discharge, the phosphor 26 shown in FIG. 4 is excited to emit light for display.

In order not to cause light emission for display, the pulse 41 shown in FIG. 5 which is to be applied to the second electrode is removed. In this case, switching is not performed and discharge does not occur between the first and third electrodes, so that there are not many charged particles in the display discharge space 25. Therefore, even if pulses 42, 43 are applied to the third electrode, discharge does not occur, and the phosphor 26 in FIG. 4 is not excited.

Thus, the pulse 41, which is applied to the second electrode, performs a role to control discharge between the first and third electrodes, and the display brightness is controlled arbitrarily by the presence or absence of this pulse.

Figure 6:
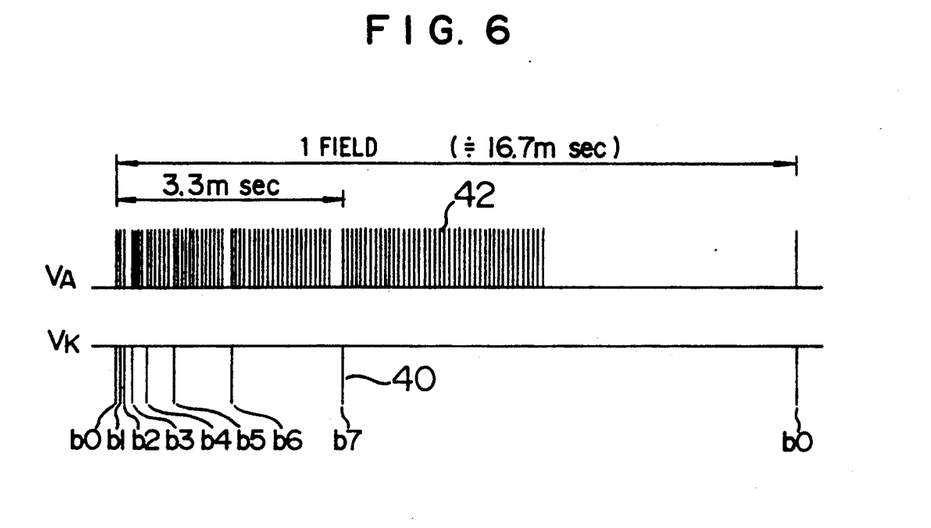
FIG. 6 is a pulse time chart for explaining the first embodiment of the tone display according to this invention.

FIG. 6 is a time chart for explaining a method of tone display in 256 levels on the gas discharge panel 3 by 8-bit binary codes. This time chart is an enlarged view of one field (about 1/60 sec =16.7 msec for NTSC television signals) shown in FIG. 1, and shows the waveform of voltage $V_K$ applied to the first electrode and the waveform of voltage $V_A$ applied to the third electrode. To the first electrode, eight scanning pulses 40 (b0, b1, . . . b6, b7) corresponding to the bits in one field are applied at time intervals proportional to bit weights. Pulses 42 applied to the third electrode start just after a scanning pulse 40 is applied and end before the next scanning pulse 40 is given. The numbers of pulses 42 at the respective bits b0, b1, . . . b6, b7 are proportional to bit weights, and if the time interval ratio is 1:2:4:8 . . . :128, a tone display by a maximum of 256 levels can be achieved by combining pulses at all those bits. Whether or not discharge is to be caused to occur by the respective pulse trains applied to the third electrode is decided by the presence or absence of a pulse (41 in FIG. 5) applied to the second electrode, which pulse reacts with scanning pulses at the bits b0, b1, . . . b6, b7 to give off discharge. If light emission in the middle period II in FIG. 5 is not negligible, by taking the brightness resulting from this into account, the number of pulses applied to the third electrode are distributed. If an absolute value of the number of pulses applied to the third electrode is decided such that a period from the leading end of b0 to the trailing end of b6 in FIG. 6 is about 3.3 msec, the above-mentioned critical fusion period is 20 (3.3+16.7) msec, so that the disturbance in tone display in a moving picture is eliminated.

In the first embodiment shown in FIGS. 1 and 6, the whole display time in a field is made shorter than a field by making the time interval from the light emission start time at a bit where the first light emission occurs in a field till the light emission start time at a bit where the last light emission occurs in the next field shorter than the critical fusion period of the perception characteristic of human eyes. However, in order to expand the light emission time, it is possible to obtain the same effect by dividing the time of at least one bit of the bits constituting a binary code into smaller time domains and controlling light emission so that light emission occurs at resulting time domains at different times.

Figure 7:
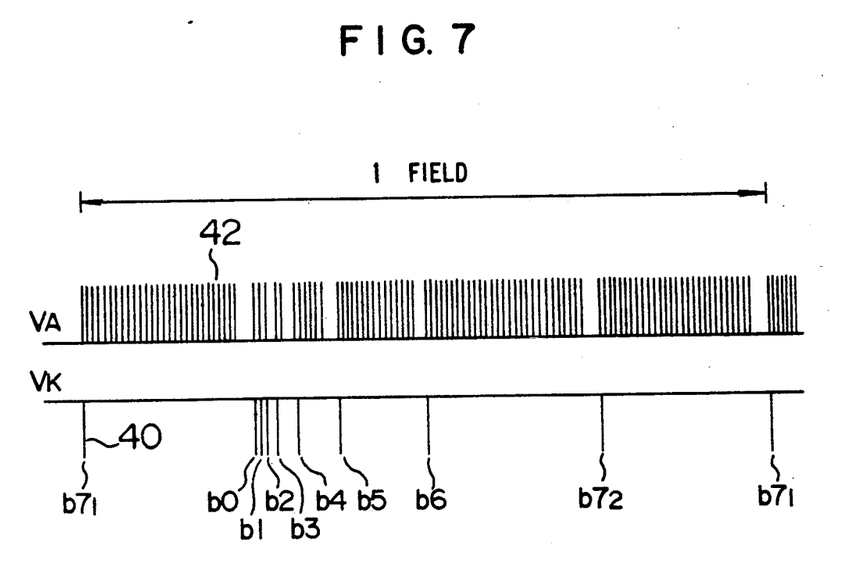
FIG. 7 is a pulse time chart for explaining a second embodiment of the tone display according to this invention.
Figure 8:
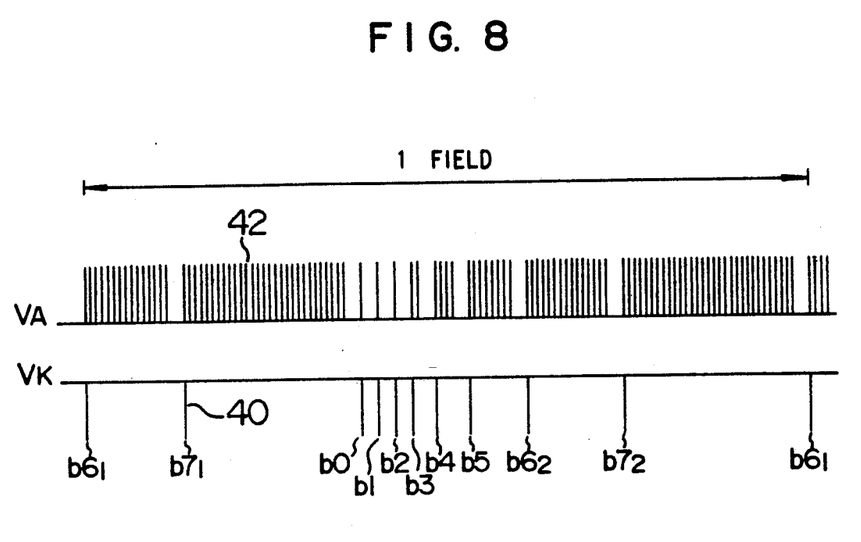
FIG. 8 is a pulse time chart for explaining a third embodiment of the tone display according to this invention.

FIGS. 7 and 8 show time charts for explaining second and third embodiments of the method of tone display according to this invention.

In the second embodiment of FIG. 7, a signal to be displayed is coded in an 8-bit form (b0, b1, ... b7), the most significant bit b7 is equally divided into $b7_1$ and $b7_2$, and light emission time domains of $b7_1$ and $b7_2$ are allotted to the leading end and the trailing end of a field. The order of light emission at the respective bits is $b7_1$, b0, b1, b2, ... b5, b6, $b7_1$. (The order may be in reverse as $b7_2$, b6, b5, ..., b1, b0, $b7_1$). In this case, the first bit in a field is b0 and the last bit in the next field is b6. The time interval of the light emission start times between those two bits is 20.8 msec. Nonetheless, a better picture quality of moving pictures can be obtained. According to the second embodiment, in a display device of the same construction as in FIG. 2, for the time of one field (about 1/60 sec for NTSC television signals), scanning pulses 40 corresponding to nine bits $b7_1$, b0, b1, ... b6, $b7_2$ are applied to the first electrode. Pulses 42 applied to the third electrode start just after a scanning pulse 40 is applied and end before the next scanning pulse 40 comes. As for the numbers of pulses at the respective bits, if the time of b7 is equally divided into $b7_1$ and $b7_2$, the pulse number ratio among the bits $b7_1$, b0, b1, ... b6, $b7_2$ is 64:1:2:4:8 ... :64:64. In this case, to turn ON b7 (pulse number ratio 128/256, b7=$b7_1$+$b7_2$), $b7_1$ and $b7_2$ are turned ON. Whether or not discharge is to be caused to occur by the respective pulse trains applied to the third electrode is decided by the presence or absence of a pulse (41 in FIG. 5) applied to the second electrode, which reacts with scanning pulses to the bits $b7_1$, b0, b1, $b7_2$ as mentioned above. If the scanning time of each line is 1 H and 240 lines (the number of lines in the upper half of the 2-line-at-a-time addressing type panel) are addressed in one field and it is necessary to control nine time domains, $b7_1$, b0, b1, ... b6, $b7_2$ for light emission, the first electrode scanning pulse width Δ is 1 H/9=7.05 μs.

If a vertical fly-back time is utilized, the scanning pulse width Δ is 1 field/(240×9)=7.72 μs.

In a third embodiment shown in FIG. 8, a signal to be displayed is coded in an 8-bit form (b0, b1, ... b7), and the times of two bits, b6 and b7 are respectively equally divided into $b6_1$, $b6_2$ and $b7_1$, $b7_2$. Times $b6_1$ and $b7_1$ are arranged at the beginning and $b6_2$, $b7_2$ are arranged at the end of a field, and the order of light emission in a field is $b6_1$, $b7_1$, b0, b1, b2, b3, b4, b5, $b6_2$, $b7_2$. In this case, the first bit in one field is b0, while the last bit in the next field is b5. The time interval of the light emission start times between those two bits is 18.8 ms, and therefore, is shorter than the critical fusion period (20 msec). In this third embodiment, the first electrode scanning pulses applied in one field is ten in each line, and the pulse width is 1 H/10≈6.3 μs. If a vertical fly-back time is utilized, the pulse width Δ is nearly equal to 6.9 μs.

Figure 9:
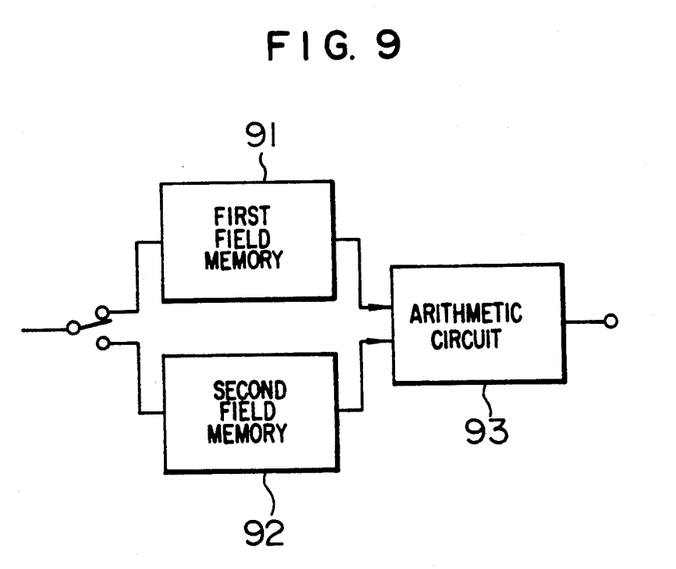
FIG. 9 is a block diagram showing an arithmetic circuit for selecting bits in the second embodiment of FIG. 7.
Figure 10A:
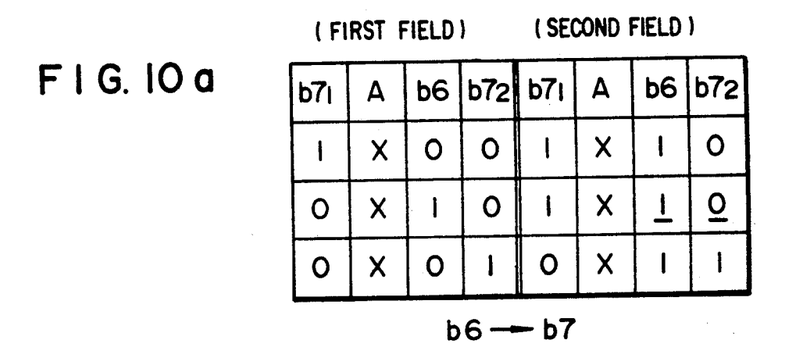
FIGS. 10a and 10b are diagrams showing the operation of the arithmetic circuit of FIG. 9.
Figure 10B:
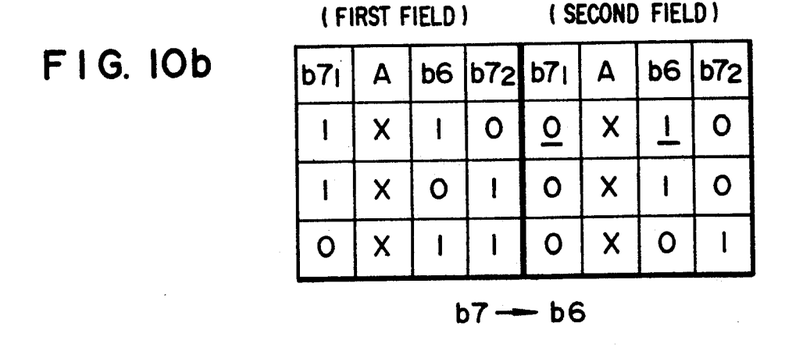

FIG. 9 is a block diagram showing an arithmetic circuit by which arithmetic operations are performed by using field memories 91, 92 and three bits $b7_1$, $b7_2$, and b6 are controlled to further improve the picture quality in the second embodiment. If b7 is equally divided into $b7_1$ and $b7_2$, then b6, $b7_1$ and $b7_2$ each have the same light emission time length (the number of pulses applied to the third electrode). In this case, if b6=1 and b7=0, it is only necessary to turn ON any one of $b7_1$, $b7_2$, and b6. If b6=0 and b7=1, it is only necessary to turn ON any two of $b7_1$, $b7_2$, and b6. At this time, which bit to turn ON is determined according to the states of b6, $b7_1$, and $b7_2$ in the previous field. For example, suppose that the second field is in the light emitting state in relation to FIG. 9. Under this condition, to which state ON or OFF, b6, $b7_1$ and $b7_2$ are turned is decided by means of an arithmetic circuit 93 which compares signals in the previous field memory 91 and the current field memory 92 according to tables of FIGS. 10a and 10b. FIG. 10a shows values of b6, $b7_1$, and $b7_2$ when the second field has changed to b6=0 and b7=1 while b6=1 and b7=0 are in the first field. This table, however, shows the conditions of b0 to b5, and the X indicates "don't care" as the value of A. Conversely, FIG. 10b shows that the second field has changed to b6=1 and b7=0 while b6=0 and b7=1 are in the first field. As described above, by controlling b6, $b7_1$, and $b7_2$ according to the signal states in the previous field, the picture quality of moving pictures can be improved remarkably by dispersing the light emission time. When b6=0 and b7=0 change to b6=1 and b7=0 or b6=0 and b7=1, values of b6, $b7_1$, and $b7_2$ are selected according to the state of A. Though description has been made of b7, when two or more bits are divided, divided bits can be controlled according to the previous light emission state. In the embodiments shown in FIGS. 7 to 10, only cases wherein b7 or b6 and b7 are divided are shown, but other bits may be divided.

Figure 11:
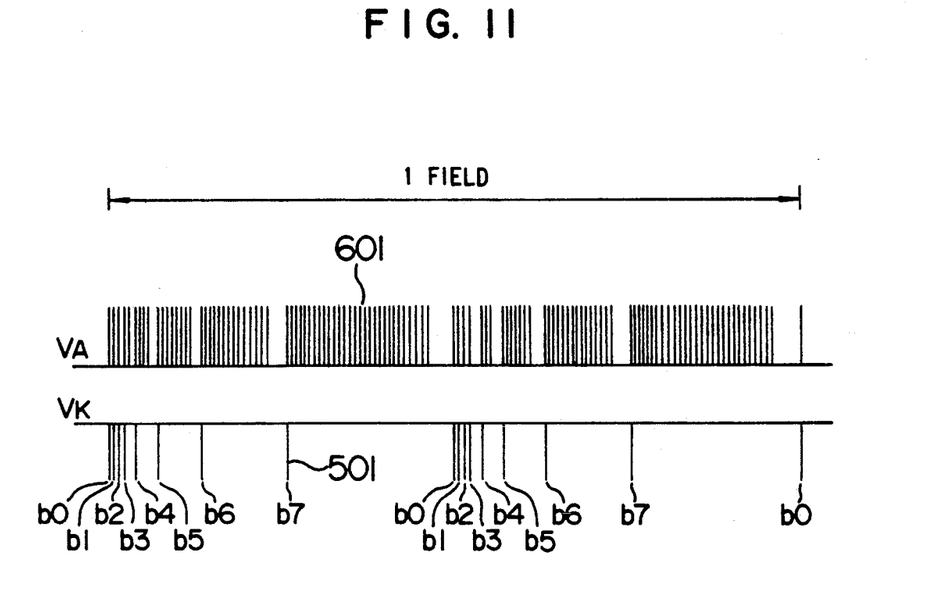
FIG. 11 is a pulse time chart for explaining a fourth embodiment of the method of tone display according to this invention.

FIG. 11 is a time chart for explaining a fourth embodiment of the method of tone display according to this invention. This fourth embodiment shows a case in which all bits b0 to b7 are used twice for display in one field, thereby improving the picture quality. When display time of all bits is bisected and used for display, the first electrode scanning time Δ in FIG. 5 is about 4 μs. In the case of FIG. 11, two sets of bits b0 to b7 may be used for the same display. As will be described by reference to FIG. 12, if one of two sets of b0 to b7 is used for field-interpolated signals, the picture quality of moving picture will be improved.

Figure 12:
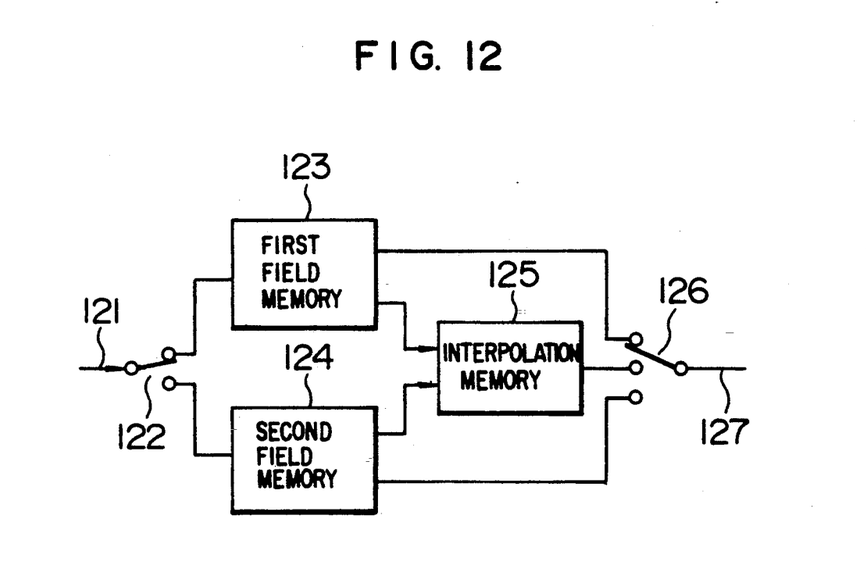
FIG. 12 is a circuit diagram for interpolating one set out of two sets of tones of FIG. 11.

FIG. 12 shows a circuit by which signals 121 for each field are stored alternately into a first field memory 123 and a second field memory 124 by means of a switch 122. Signals from the two memories 123 and 124 are supplied to an interpolation memory 125 where signals are interpolated and stored. Signals 127 of b0 to b7 of every half field are outputted by means of a switch 126 from the interpolation memory 125.

Preferred embodiments of this invention have been described, but this invention is not limited to the embodiments described.

In the foregoing embodiments, the luminous elements are caused to emit light when the bits are "1". However, needless to say, the luminous elements may be arranged to emit light when the bits are "0".

In the methods of tone display using the bits of binary light emission signals in the embodiments shown in FIGS. 1, 7 and 8, if light emission is caused to occur in the order of b7, b6, ... b0, obtained by time reversal, the same effects can be achieved. Therefore, it is possible to operate this invention in such a mode of embodiment.

According to this invention, by making the time interval of the light emission start times between the bit where the first light emission occurs in one field and the bit where the last light emission occurs in the next field shorter than the critical fusion period of the perception characteristic of human eyes, the disturbances in the tone display can be reduced in large pictures, high-brightness pictures or moving pictures. Another effect of this invention is that if one or more bits having greater weights of a binary light emission code are divided and separated on a time base and applied to the luminous elements to cause them to emit light separately, the disturbance in tone display can be reduced without decreasing the brightness and thus, the display quality is improved.

We claim:

1. A method of controlling the brightness of a display formed on a display panel including a plurality of luminous elements, said method comprising the steps of:
    dividing the time duration of a field of a television signal into a plurality of sub-fields, each sub-field having a duration corresponding to the value of a respective one of the bits of a multiple-bit binary code;
    supplying the luminous elements with an energization signal including a plurality of signal portions, each signal portion having a duration corresponding to the duration of a respective one of the sub-fields; and
    supplying each luminous element with a control signal to cause the luminous elements to selectively emit light during sub-fields indicated by the control signal, so that the brightness levels of the luminous elements correspond with the control signal.

2. A method of tone display according to claim 1, further comprising dividing at least one of the sub-fields into at least two smaller sub-fields sandwiching at least one sub-field therebetween, thereby allowing each luminous element to emit light at least two times in a field of the television signal.

3. A method of tone display according to claim 2, wherein the lengths of time of said at least two smaller sub-fields are equal.

4. A method of tone display according to claim 2, wherein at least one of the sub-fields which is divided into at least two smaller sub-fields includes the sub-field having a duration corresponding to the most significant bit of the multiple-bit code.

5. A method of tone display according to claim 1 wherein the time duration is divided into a plurality of sets of sub-fields.

6. A method as claimed in claim 1, wherein for each luminous element, the time interval between the light emission start time in the sub-field in which the light emission first occurs during a field of the television signal and the light emission start time in the sub-field in which the light emission last occurs during the next field of the television signal is shorter than the critical fusion period of the perception characteristic of human eyes.

7. A method of tone display according to claim 6, wherein said critical fusion period of the perception characteristic of human eyes is substantially 20 msec.

8. A method of tone display according to claim 6, wherein said time interval is not greater than substantially 20.8 msec.

9. A luminous display device comprising:
    a display panel including a plurality of luminous elements, each of said luminous elements adapted for controllable light emission;
    means for indicating time intervals of a plurality of sub-fields of a field of a television signal, each sub-field having a duration corresponding to the value of a respective one of the bits of a multiple-bit binary code;
    means for supplying said luminous elements with an energization signal including a plurality of signal portions, each signal portion having a duration corresponding tot he duration of a respective one of the sub-fields; and
    means for supplying each luminous element with a control signal to cause said luminous elements to selectively emit light during sub-fields indicated by the control signal, so that the brightness levels of said luminous elements correspond with the control signal.

10. A luminous display device according to claim 9, wherein said indicating means indicates at least two smaller sub-fields sandwiching at least one sub-field therebetween, thereby making it possible to cause each luminous element to emit light at least two times in a field of television signals.

11. A luminous display device according to claim 10, wherein the durations of said at least two smaller sub-fields are equal.

12. A luminous display device according to claim 10, wherein said luminous elements comprise gas discharge luminous elements having a continuous discharge memory function.

13. A luminous display device according to claim 9, wherein two sets of said sub-fields are provided in a time corresponding to a field of television signal.

14. A luminous display device according to claim 13, further comprising means for supplying to one of said sets of sub-fields interpolation signals of said multiple-bit binary codes in said two consecutive fields.

15. A luminous display device according to claim 13, wherein said luminous elements comprise gas discharge luminous elements having a continuous discharge memory function.

16. A luminous display device according to claim 9, wherein said luminous elements comprise gas discharge luminous elements having a continuous discharge memory function.

17. A luminous display device as claimed in claim 9, wherein for each luminous element, the time interval between the light emission start time in the sub-field in which the light emission first occurs during a field of the television signal and the light emission start time in the sub-field in which the light emission last occurs in the next field of the television signal is shorter than the critical fusion period of the perception characteristic of human eyes.

18. A luminous display device according to claim 17, wherein said critical fusion period of the perception characteristic of human eyes is substantially 20 msec.

19. A luminous display device according to claim 17, wherein said time interval is not greater than substantially 20.8 msec.

20. A method of tone display for controlling the brightness of a picture to be displayed by varying luminous times of luminous elements forming a display panel, said method comprising the steps of:

dividing time corresponding to a field of television signals into a plurality of sub-fields corresponding to bits of a multiple-bit code representing a level of brightness of each luminous element, and allotting said sub-fields to said luminous elements, said plurality of sub-fields having lengths of time proportional to weights of corresponding bits;

consecutively supplying said luminous elements with multiple-bit codes;

causing said luminous elements to emit light in sub-fields corresponding to said bits, having either "1" or "0", of said multiple-bit codes, wherein for each luminous element, a time interval from a light emission start time at a sub-field where the first light emission occurs in a time corresponding to a field of television signals till a light emission start time at a sub-field where the last light emission occurs in a time corresponding to the next field of television signals is made shorter than the critical fusion period of the perception characteristic of human eyes, and wherein at least one of said sub-fields is divided into at least two smaller sub-fields sandwiching at least one sub-field therebetween, thereby making it possible to cause each luminous element to emit light at least two times in a field of television signals.

21. A method of tone display according to claim 20, wherein said critical fusion period of the perception characteristic of human eyes is substantially 20 msec.

22. A method of tone display according to claim 20, wherein said time interval is not greater than 20.8 msec.

23. A method of tone display according to claim 20, wherein the lengths of time of said at least two smaller sub-fields are equal.

24. A method of tone display according to claim 20, wherein at least one of said sub-fields which is divided into at least two smaller sub-fields includes the most significant bit of said multiple-bit code.

25. A method of tone display according to claim 20, wherein a plurality of sets of said sub-fields are provided in a time corresponding to a field of a television signal.

26. A luminous display device comprising:

a display panel having arranged thereon a plurality of luminous elements, light emission or no light emission of said luminous elements being controllable;

means for consecutively supplying said luminous elements with multiple-bit codes representing levels of brightness thereof;

means for dividing time corresponding to a field of television signals into a plurality of sub-fields having lengths of time proportional to weights of corresponding bits of a multiple-bit code to assign said sub-fields to said luminous elements;

means for causing said luminous elements to emit light in sub-fields corresponding to said bits, having values of either "1" or "0", of said multiple-bit codes;

wherein for each luminous element, a time interval from a light emission start time at a sub-field where the first light emission occurs in a time corresponding to a field of television signals till a light emission start time at a sub-field where the last light emission occurs in a time corresponding to the next field of television signals is made shorter than the critical fusion period of the perception characteristic of human eyes, and wherein at least one of said sub-fields is divided into at least two smaller sub-fields sandwiching at least one sub-field therebetween, thereby making it possible to cause each luminous element to emit light at least two times in a field of television signals.

27. A luminous display device according to claim 26, wherein said critical fusion period of the perception characteristic of human eyes is substantially 20 msec.

28. A luminous display device according to claim 26, wherein said time interval is not greater than 20.8 msec.

29. A luminous display device according to claim 26, wherein lengths of time of said at least two smaller sub-fields are equal.

30. A luminous display device according to claim 29, wherein said luminous elements comprise gas discharge luminous elements have a continuous discharge memory function.

31. A luminous display device according to claim 26, wherein two sets of said sub-fields are provided in a time corresponding to a field of a television signal.

32. A luminous display device according to claim 31, further comprising means for supplying to one of said sets of sub-fields interpolation signals of said multiple-bit codes in said two consecutive fields.

33. A luminous display device according to claim 31, wherein said luminous elements comprise gas discharge luminous elements have a continuous discharge memory function.

34. A luminous display device according to claim 26, wherein said luminous elements comprise gas discharge luminous elements having a continuous discharge memory function.

* * * * *